June 4, 1946.   U. J. BROWN   2,401,546
SCALE REMOVER AND SCALE AND CORROSION PREVENTER
Filed Nov. 20, 1942   2 Sheets-Sheet 1
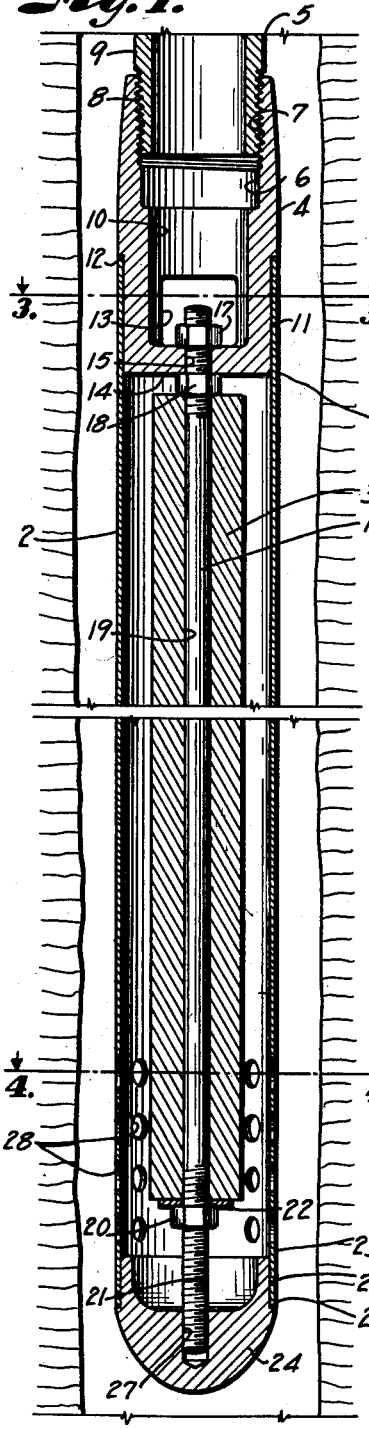
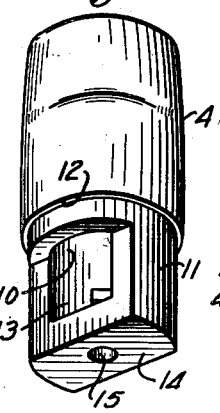
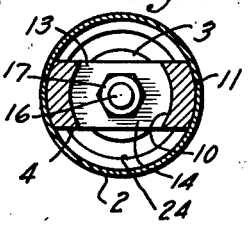
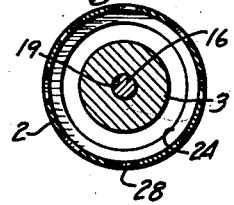
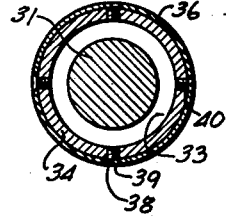
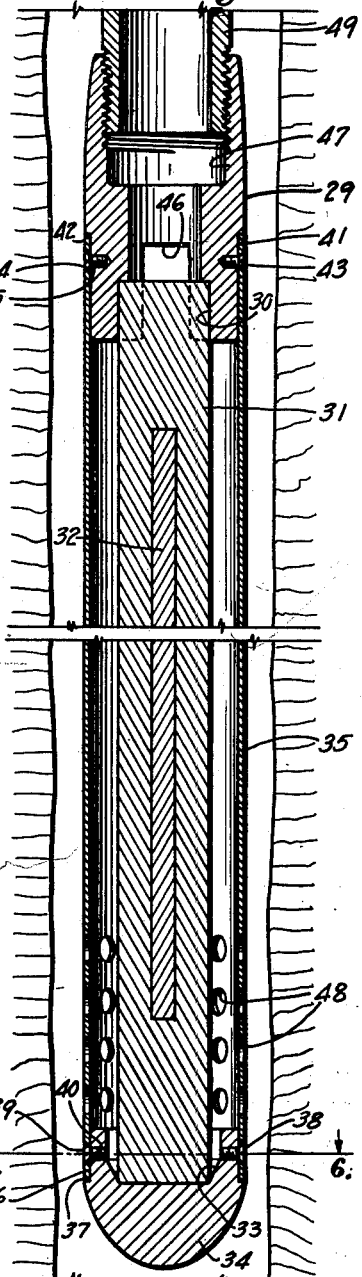
INVENTOR:
Ual J. Brown.
BY Arthur C. Brown
ATTORNEYS.

June 4, 1946.    U. J. BROWN    2,401,546
SCALE REMOVER AND SCALE AND CORROSION PREVENTER
Filed Nov. 20, 1942    2 Sheets-Sheet 2
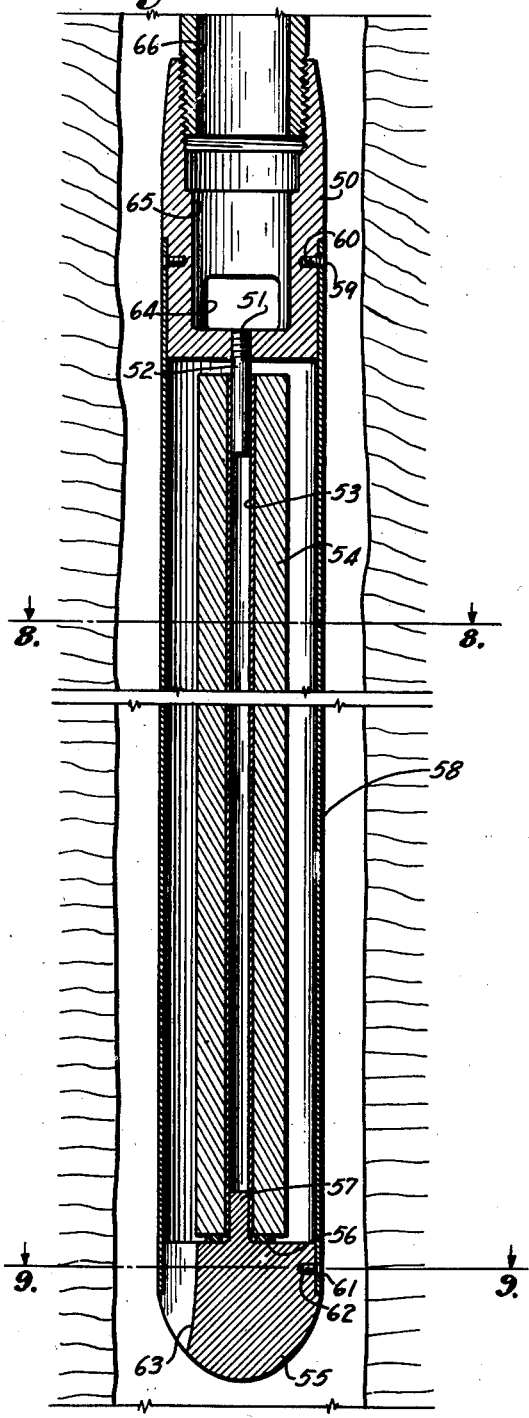
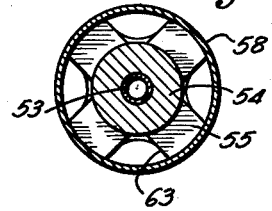
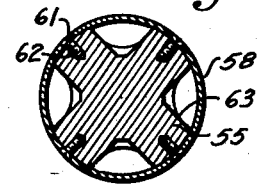
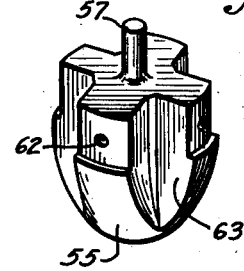
INVENTOR:
Ual J. Brown.
BY Arthur C. Brown.
ATTORNEYS.

UNITED STATES PATENT OFFICE 2,401,546

SCALE REMOVER AND SCALE AND CORROSION PREVENTER

Ual J. Brown, Oklahoma City, Okla.

Application November 20, 1942, Serial No. 466,343

1 Claim. (Cl. 204—197)

This invention relates to scale removers, including corrosion and scale preventers, and more particularly to an electrochemical device for preventing corrosion and for removing and preventing scale formation on the metal parts of equipment having contact with oil or water, such as in oil and water wells, boilers, et cetera.

Water and oil from natural sources often contain, in solution, various compounds of lime, sodium, magnesia, and sulfates, which form scale and deposits on the metal parts of well equipment, particularly when relatively high temperatures are encountered. Many of these encrustations are hard adhering scale which are very difficut to remove and often stop flow into the wells necessitating a rod and tubing pulling job with the result that there is a great loss in production as well as loss of equipment and increased expense of operation of the well. Some of the compounds encountered in the fluid corrode the metal parts of the equipment causing premature breakage and loss of production and equipment. Chemical treatment sometimes removes the scale, but it is practically impossible to provide a chemical particularly in the bottom of a well that prevents formation of the scale on the metal parts of the equipment.

The principal object of the present invention is therefore to provide a device of this character in which two dissimilar metals are arranged in the fluid in spaced relation to establish an electrical current to effect corrosion and scale prevention.

Other objects of the invention are to provide a scale prevention device in which one metal, preferably zinc, is supported in a barrel of a dissimilar metal, preferably copper; to provide for electrical contact at least at one point between the spaced dissimilar metal elements of the device; to provide a corrosion and scale preventer adapted to be connected in the bottom of a well pumping device; to provide a streamlined unit adapted to pass the projections in a well or the like in which the device is placed; to provide for supporting a zinc element in a copper housing of the unit without any strain on the zinc element; to provide for admission of fluid at one end of the unit for flow therethrough and discharge at the other end; to provide a unit in which all the fluid removed from the well must pass between the dissimilar metals; to provide a scale prevention unit which creates an electrical current and so treats a well fluid passing therethrough that scale on the metal parts of the well mechanism is dissolved and removed; to provide for supporting a zinc element in a descaling unit in such a manner that buckling of the element is prevented; to provide a descaling unit for attachment to the bottom of well equipment whereby one of the dissimilar metals supports the other dissimilar metal in operative position; to provide a descaling unit in which here is no restriction to flow of fluid therethrough; to provide a corrosion and scale preventer of this character which is simple in construction, reliable and efficient in operation, strong, durable and economical to manufacture; and to provide improved elements and arrangements thereof in a corrosion and scale preventer of the character described.

In accomplishing these and other objects of the present invention, I have provided improved details of structure, the preferred form of which is illustrated in the accompanying drawings, wherein:

Fig. 1 is a vertical sectional view of a corrosion and scale preventer embodying the features of the present invention, the unit being shown connected to the bottom of the well operating mechanism.

Fig. 2 is a bottom perspective view of a connecting member for connecting the descaling unit to the bottom of a well operating mechanism.

Fig. 3 is a transverse sectional view through the shell and connecting member on the line 3—3, Fig. 1.

Fig. 4 is a transverse sectional view through the unit on the line 4—4 of Fig. 1.

Fig. 5 is a vertical sectional view through a modified form of the apparatus on which the zinc element is supported by the barrel and end members of the unit.

Fig. 6 is a transverse sectional view through the unit on the line 6—6, Fig. 5.

Fig. 7 is a vertical sectional view of a further modified form of the scale prevention unit using a tubular member for preventing buckling and for centrally locating the zinc element, the section being taken through only one of the grooves in the lower portion of the unit.

Fig. 8 is a transverse sectional view through the unit on the line 8—8, Fig. 7.

Fig. 9 is a transverse sectional view through the unit on the line 9—9, Fig. 7.

Fig. 10 is a perspective view of the bottom closure of the modified unit shown in Fig. 7.

Referring more in detail to the drawings:

1 designates a corrosion and scale prevention device consisting of dissimilar metals adapted to be immersed in a well fluid and preferably composed of a copper barrel 2 and a zinc element 3 adapted to be connected by a connecting member 4 to the bottom of well operating equipment 5, which, in the present instance, is illustrated as the inlet nipple of pumping equipment, or the like. The connecting unit 4 is preferably cylindrical in shape and provided with a recess 6 having internal threads 7 adapted to be threadedly connected to the threads 8 of an inlet nipple 9. The recess 6 is provided with a reduced extension 10 extending downwardly into the lower portion of the connecting member which is provided with a reduced diameter 11 to receive the upper end of the barrel 2 and which is in substantially flush relation with the same, and is preferably provided with a shoulder 12 for engagement with the upper edge of said barrel. The lower portion of the reduced diameter 11 of the connecting member is preferably removed at the sides to expose openings 13 leading to the recess 10, said removed portions being of sufficient size to permit free flow of fluid to and through the opening 13 to the well pumping equipment. The lower end of the connecting member is preferably provided with a bridge 14, having a bore 15 therein for receiving a rod 16, which is preferably held in place by nuts 17 and 18 engaging the upper and lower surfaces of the bridge 14.

The zinc element 3 is preferably provided with a bore 19 whereby said element may be sleeved over the rod 16 and held in place by a nut 20 threaded on the lower end 21 of the rod 16, a washer 22 being preferably inserted between the nut and element. It is also contemplated that the zinc element might be cast directly on the rods and the nuts used to hold said element in place in case dissolution of the zinc loosened the engagement between the element and the rod 16.

The barrel 2 is of longer length than the element whereby the lower end 23 extends downwardly below said element and is adapted to be closed by a closure member 24 preferably having a rounded surface on the bottom thereof to permit insertion of the unit in tubing or other well openings without danger of engagement between the closure member and the obstructions in said well. The closure member 24 is provided with a reduced diameter 25 forming a shoulder 26 adapted to be inserted in the barrel 2 and provide engagement between the lower end 23 of the sleeve and the shoulder 26 when the closure member is engaged with the end 21 of the rod 16 by threading the rod into the threaded recess 27, whereby the rod 16 supports the closure member 24 which may be tightened thereon to snugly hold the barrel in place. Adjacent the lower end of the barrel is a series of openings 28 adapted to permit entrance of fluid into the tubing for passage between the copper barrel and the zinc element through the unit, opening 13, recess in the connecting member and into the nipple 9, for passage to the well pumping equipment. It is to be noted that the flow of fluid into the copper barrel is dispersed by the number of openings 28.

In assembling a corrosion and scale prevention unit of the character described, the nut 18 is threaded onto the rod 16 and the end of said rod inserted in the opening 15. The nut 17 is then threaded on the upper end of the rod to tighten same in place and rigidly hold it on the connecting member. The zinc element 3 is then sleeved over the rod and the upper end thereof held in engagement with the nut 18 by the nut 20 which is threaded on the lower end of the rod 16, the washer 22 being placed between the nut 20 and the element 3. The barrel 2 is then placed over the zinc element 3 and the upper end thereof slipped over the reduced diameter 11 of the connecting member and into engagement with the shoulder 12 and is held in place by the closure member 24 which is threaded on the end of the rod 16 until the shoulder 26 engages the barrel 2 to hold same in place. The entire unit as assembled is adapted to be placed on the end of well operating equipment and lowered into a well, where it is adapted to be submerged in the well fluid.

The operation of the corrosion and scale prevention unit after it is submerged in a well fluid where such fluid contains foreign particles, substances, salts, elements or compounds of such to act as an electrolyte, sets up a slight current of electricity which is sufficient to render the iron or steel of a vessel, container, well equipment, or metal of similar electromotive series, inactive both from a scaling condition, conditions of rust or oxidation caused by corrosion or mild form of electrolysis. When the foreign particles or compounds are present in the fluid, the zinc element acts as a negative pole and the copper barrel as a positive pole, causing current to flow from the zinc through the electrolyte or fluid, to the copper, and back through either the closure member 24 of the connecting member 4 to the rod 16, which is preferably steel or other conducting material, to complete the circuit to the zinc element. It is preferable that the connecting member and closure member be of brass or the like.

The current of electricity created by the scale prevention unit not only prevents formation of scale on the metal of the equipment but also causes the fluid flowing through the metal members of the equipment to slowly dissolve the scale formations that are present thereon, thereby preventing stopping of flow through the equipment and eliminating rod and tubing pulling jobs as well as loss of equipment through corrosion and breakage.

In the form of the invention shown in Figs. 5 and 6, the lower end of the connecting member 29 is provided with an enlarged bore 30 adapted to receive the upper end of the zinc element 31, which is preferably cast or rolled with an insert 32 therein to prevent buckling of the element, particularly when high temperatures are encountered. In this form of the invention, the lower end of the element 31 is received in a tapered recess 33 in a closure member 34, whereby the taper 33 maintains the element in a central location relative to its barrel 35, preferably formed of copper, having its lower end sleeved over the reduced diameter 36 and engaged with a shoulder 37 of the closure member 34, said barrel being secured to the closure member by means of countersunk screws 38 extending through apertures 39 in the barrel and threaded into threaded openings 40 in the closure member 34. The upper end of the barrel extends over a reduced diameter 41 of the connecting member and in engagement with a shoulder 42 thereon, said barrel being secured to the connecting member by means of screws 43 extending through openings 44 in said sleeve and threaded into threaded recesses 45 in said connecting members.

As in the preferred form of the invention, the connecting member is flattened on the sides and provided with openings 46 leading to the bore 47 of said connecting member to permit flow of fluid into openings 48 adjacent the lower end of the barrel, upwardly between the copper barrel and zinc element, through the openings 46 and bore 47 and into the well operating equipment 49.

In this form of the invention the zinc element is held in place by the screws anchoring the barrel to the connecting member and closure member respectively, and the engagement between the zinc element and the closure member or connecting member completes the circuit to create the electric current to prevent corrosion and scaling of the well equipment. The zinc element extends into the bore of the connecting member a sufficient distance that there will be no danger that decomposition of the zinc during operation of the unit permits the upper end of the zinc element to be lowered below the connecting member until said zinc element needs to be replaced, thereby always maintaining the element in spaced condition relative to the copper shell.

In the form of the invention shown in Figs. 7 to 10 inclusive, the connecting member 50 is provided with a centrally located, threaded opening 51 in which is threaded a pin 52 adapted to be engaged in a tube 53 preferably made of steel or the like and forming the central support of the zinc element 54. In this form of the invention, it is preferable that the zinc either be rolled or cast on the tube, however, said zinc element may be provided with an opening therethrough and a steel tube sleeved therein. The lower end of the zinc element is supported on the closure member 55 by a washer 56 and held in a central location by an upwardly projecting pin 57 which engages in the tube 53. The copper barrel 58 is preferably held on the connecting member by means of screws 59 threaded into threaded apertures 60 in said connecting member, said barrel 58 supporting the zinc element by being connected to the closure member by screws 61 threaded into threaded apertures 62 in said closure member. Entrance of well fluid into the scale prevention unit is preferably by means of grooves 63 in the closure member 55, which grooves extend downwardly below the edge of the barrel 58 to permit free passage of fluid therein and upwardly between the barrel and zinc element, through openings 64 in the connecting member, through the bore 65 therein, and into the bore of the nipple 66 connecting with the well operating equipment.

While I have particularly illustrated and described a corrosion and scale prevention device adapted to be placed at the bottom of a well or the like on the ends of the well operating equipment, it is obvious that the invention is adapted for other uses where water or oil containing solutions of various compounds of lime, sodium, magnesia and sulfates are found in which there are possibilities of scale or deposits forming on the metal parts of the equipment.

From the foregoing it is apparent that I have provided an electrochemical device for preventing corrosion and removing and preventing scale formation on the metal parts of equipment having oil, water or like fluids and it is also apparent that the structure is particularly adapted for economical manufacture and efficient operation as a corrosion and scale preventer and that it is not subject to breakage of the elements or other premature deterioration.

What I claim and desire to secure by Letters Patent is:

A corrosion and scale preventing device for attachment to well operating equipment for submergence in the liquid in a well hole comprising a copper barrel, a cylindrical connecting member provided at the lower end with a bottom wall and interiorly recessed in the upper portion to receive the inlet nipple of said well operating equipment and adapted to be secured thereto, said connecting member having its lower portion fitted in and secured to the upper end of said barrel in substantially flush relation therewith and reduced in size to provide an intervening space between the reduced portion and the barrel and having openings at said intervening space communicating with the interior of the connecting member above said bottom wall, an enlongated zinc element having a bore extending longitudinally therethrough the length thereof, a bottom member mounted at the bottom and provided at the upper portion with an annular recess receiving the lower end of the barrel and secured thereto, said bottom member being provided at the top with a stem slidably engaging in the lower end of the bore of the zinc element, said bottom member constituting supporting means for supporting said zinc element in spaced relation to said barrel, and a rod secured at its upper end to said bottom wall and extending into and having sliding engagement with the upper end of said bore in said zinc element for maintaining said zinc element in spaced relation to the upper end of the barrel whereby the zinc element is held in spaced relation to said connecting member to provide for expansion and contraction of said zinc element, said supporting means providing an electrical connection between the zinc element and the copper barrel and said supporting means having grooves therein for the admission of liquid for passage between the barrel and the zinc element to the well operating equipment through said connecting member, whereby an electric current is set up between the zinc element and the copper barrel for acting on said liquid.

UAL J. BROWN.